(12) United States Patent
Ishikawa et al.

(10) Patent No.: US 6,348,273 B1
(45) Date of Patent: Feb. 19, 2002

(54) METHOD FOR BONDING DIFFERENT MEMBERS AND COMPOSITE MEMBERS BONDED BY THE METHOD

(75) Inventors: Takahiro Ishikawa, Nagoya; Masayuki Shinkai, Ama-gun; Masahiro Kida, Nagoya, all of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/603,203

(22) Filed: Jun. 26, 2000

(30) Foreign Application Priority Data

Jun. 25, 1999 (JP) .................................. 11-180902

(51) Int. Cl.⁷ ..................... B32B 15/04; B32B 15/16
(52) U.S. Cl. ................. 428/621; 428/632; 428/403; 428/432; 428/469; 428/702
(58) Field of Search ............................. 148/516, 512.7, 148/528, 535, 537, 426, 430, 437; 428/615, 650, 671, 672, 673, 674, 621, 632, 403, 432, 469, 702, 545, 546, 547, 551, 556

(56) References Cited

U.S. PATENT DOCUMENTS

| 4,932,582 A | 6/1990 | Une |
| 6,057,513 A | * 5/2000 | Ushikoshi et al. |

FOREIGN PATENT DOCUMENTS

JP 6-126479 5/1994

* cited by examiner

*Primary Examiner*—Deborah Jones
*Assistant Examiner*—Jennifer McNeil
(74) *Attorney, Agent, or Firm*—Parkhurst & Wendel, L.L.P.

(57) ABSTRACT

A bonding method for bonding one member having a dented portion and a second different member having an engaging protruding portion with an adhesive composition having a controlled coefficient of expansion and the resultant composite product. Three alternative techniques are used to first apply a hard solder in contact with a layer of fine particles between the two members. Then a final heating is applied under pressure to melt the hard solder. The resulting bonding layer bonds the two different fitting members.

8 Claims, 4 Drawing Sheets

Mo

Composite Layer

AlN

Al Solder

Al$_2$O$_3$

AlN

Al Solder
Al$_2$O$_3$

AlN

Mo →
Al Solder →
AlN →

Mo →
Al Solder →
AlN →

Mo →
Al Solder →
AlN →

METHOD FOR BONDING DIFFERENT MEMBERS AND COMPOSITE MEMBERS BONDED BY THE METHOD

BACKGROUND OF THE INVENTION

The present invention relates to a composite member comprising two or more different members bonded through a fitting structure, and a method for bonding the different members through a fitting structure. More particularly, it relates to a composite member comprising two or more different members which are bonded to each other with an adhesive composition controlled in its expansion coefficient through a fitting structure, and a method for producing the composite member by bonding two or more different members with an adhesive composition controlled in its expansion coefficient.

There is a method of using a solder for bonding, for example, a ceramic member and a metallic member. However, during cooling operation after bonding them at high temperatures, thermal stress is generated owing to the difference in thermal expansion coefficient between the different members or between the member and the solder used for bonding of these different members to cause separation at the bonded interface, or if one of the members is fragile, cracks occur in the vicinity of the bonded interface and sometimes the desired bonding strength or airtightness cannot be obtained. The products in which these defects are caused during the production steps must be disposed of as rejected products, and this results in increase of the production cost of these composite members. Moreover, if they are subjected to thermal cycles in use, the defects occur after use for a certain period to cause deterioration of reliability of the products.

When different members are bonded using a solder, a method is generally employed according to which the surface of the ceramic member to be bonded is plated with a metal such as Ni to ensure wetting between the ceramic member and the solder, then these members are disposed opposite to each other with a suitable space, the solder is poured into the space, and the members are bonded. There is another method according to which an additive such as Ti which can ensure wetting by forming a reactive layer of a nitride or an oxide on the surface of the ceramic member is added to the solder, without carrying out the plating with a metal. However, these methods are not preferred because they are not enough to reduce the thermal stress, and cracks are often formed on the side of the ceramic member which is fragile against thermal stress or separation is caused at the bonded part to adversely affect various performances such as bonding strength and airtightness required for composite member. As method for relaxing the thermal stress, generally employed are a method of using a metal low in thermal expansion coefficient as an intermediate material at the time of bonding and a method of using as an intermediate material a soft metal which is high in reactivity with ceramics and can relax the stress by plastic deformation. However, these techniques also suffer from the problems caused by difference in thermal expansion between the solder and the member, for example, low thermal cycle characteristics, and cannot necessarily be said to be high in general-purpose properties. Furthermore, there is a high-pressure solid phase bonding method which is now under development, but this method has unsolved problems for practical utilization and cannot provide a sufficient bonding strength.

On the other hand, as a composite solder, JP-A-6-126479 discloses a mixture of powders comprising materials higher in melting point than solder and used for bonding of a semiconductor chip and a substrate. However, this aims at solution of insufficient wetting of the conventional composite solder caused by the powder also present on the surface by filling a powder comprising materials higher in melting point than the solder only in the central portion of the solder per se, in other words, aims at increase of bonding strength at the bonded interface. This composite solder is not effective for decrease of thermal stress, and, hence, is not effective for solution of the problems caused by the thermal stress between the members to be bonded or between the member and the solder.

As a result of intensive research conducted by the inventors for attaining the above object, they have found an adhesive composition for bonding at least two different members which does not cause decrease of bonding strength in the vicinity of the bonded interface due to thermal stress generated during cooling operation after bonding at high temperatures and does not cause generation of cracks in the member weak against the thermal stress during the cooling operation with maintaining an appropriate bonding strength between the different members. A patent application No.10-52971 was filed on this subject.

That is, as a result of intensive research, the inventors have found that at least two different members can be bonded without causing decrease of bonding strength in the vicinity of the bonded interface due to thermal stress generated during cooling operation after bonding at high temperatures and without causing generation of cracks in the member weak against the thermal stress during the cooling operation with maintaining an appropriate bonding strength between the different members by using as a base a hard solder which is not restricted by the kind of the members or shape of the members and which leaves room for selection of bonding shape and by adding to the hard solder a fine particle material which lowers the thermal stress. Thus, the above patent application was filed.

As a method for bonding with the above composition, the patent application discloses a method which comprises disposing two or more different members differing in thermal stress so that they are opposed with a space enough to bond them and pouring the composition into the space or filling a given amount of ceramic or cermet fine particles and subsequently pouring a given amount of the hard solder, followed by cooling to produce a composite member. However, the composition cannot be used as it is for bonding the members not provided with a space therebetween enough to be able to pour a given amount of the hard solder.

In the case of bonding two or more different members which must be bonded through a fitting structure, especially, in the case of bonding the members with selecting a very narrow clearance of about 0.01–0.30 mm, various troubles often occur unless a solder is filled also on the side of the members as uniformly as possible. On the other hand, when the clearance is greater than the above upper limit, cracks sometimes occur due to the residual stress which is generated owing to non-uniform filling of the solder in the clearance and is contained in the solder. This will be more specifically explained. For example, when a member having a columnar dented portion and a member having a columnar protruded portion are fitted, if the solder to be uniformly filled in the columnar clearance formed by these members is one-sidedly filled on only one side because the clearance has a room to some extent, the balance of thermal shrinkage stress is lost in the process of cooling and solidifying the solder and the member having the columnar protruded portion is pulled to one direction, resulting in residual stress and cracks. Moreover, there are demands for dimensional accuracy and beautiful appearance of the composite member as a finished product. Thus, since it is substantially impossible to pour a given amount of a hard solder from a narrow clearance in the members having only such a narrow clearance, these different members cannot be bonded by the above method. The clearance here means a width of the space present between the wall surfaces of the different members in the fitting structure.

SUMMARY OF THE INVENTION

The object of the present invention is provide a method for bonding different members through a fitting structure by forming a bonding layer of an adhesive composition controlled in expansion coefficient in case the clearance between the wall surfaces of the different members in the fitting structure does not have a space enough to pour a given amount of a hard solder therein, and a composite member comprising the thus bonded different members.

As a result of intensive research conducted by the inventors for attaining the above object, they have found that a member having a dented portion which forms a fitting structure and a member having a protruded portion which forms a fitting structure and being different from the member having the dented portion can be bonded by fitting them to each other in the following manner. A fine particle material is uniformly spread over the surface of the dented portion of the member having the dented portion, then a platy or powdery hard solder is disposed so as to cover at least a part of the layer comprising the fine particle material, further the member having the protruded portion is disposed, these are heated to a given temperature under application of pressure to melt the hard solder, and this molten hard solder is penetrated into the layer comprising the fine particle material to form a bonding layer of an adhesive composition controlled in expansion coefficient comprising the hard solder and the fine particle material, or a fine particle material is uniformly spread over the surface of the dented portion of the member having the dented portion, then the member having the protruded portion having one or a plurality of holes in which a hard solder is inserted is disposed so as to closely contact with the layer comprising the fine particle material, these are heated to a given temperature under application of pressure to melt the hard solder, and this molten hard solder is penetrated into the layer comprising the fine particle material to form a bonding layer of an adhesive composition controlled in expansion coefficient comprising the hard solder and the fine particle material, or a member having a protruded portion at the end of which is formed a layer comprising a hard solder and a fine particle material is previously prepared, only a hard solder is disposed on the surface of a dented portion of a member having the dented portion, the member having the protruded portion at the end of which is formed a layer comprising the hard solder and the fine particle material is disposed on the hard solder disposed on the surface of the dented portion of the member, these are heated to a given temperature under application of pressure to melt the layer comprising the hard solder and the particulate material formed at the end of the member having the protruded portion and the hard solder disposed on the surface of the dented portion of the member having the dented portion, thereby to form a bonding layer of an adhesive composition controlled in expansion coefficient comprising the hard solder and the fine particle material. Thus, there has been completed the present invention of the first aspect, namely, a method for bonding a member having a dented portion which forms a fitting structure and a member having a protruded portion which forms a fitting structure and being different from the member having the dented portion by fitting these members.

Furthermore, the inventors have found a composite member having improved thermal cycle characteristics even after being assembled and comprising two or more different members obtained by the above fitting and bonding method, characterized by comprising at least a member having a dented portion which forms a fitting structure and a member having a protruded portion which forms a fitting structure and being different from the member having the dented portion, said different members being bonded to each other with an adhesive composition controlled in expansion coefficient comprising a fine particle material and a hard solder. Thus, the present invention of the second aspect has been completed.

DESCRIPTION OF THE INVENTION

Figure 1:
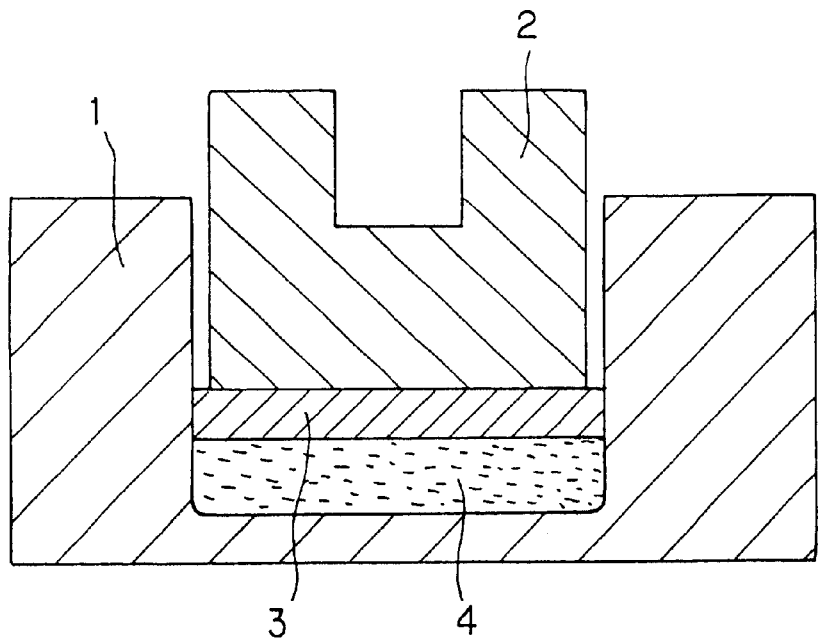
FIG. 1 schematically shows one embodiment of the bonding method of the present invention.

The first aspect of the present invention relates to a method for fitting and bonding a member having a dented portion which forms a fitting structure and a member having a protruded portion which forms a fitting structure and being different from the member having the dented portion, said method comprising the following steps: a step of uniformly spreading a fine particle material over the surface of the dented portion of the member having the dented portion, then disposing a platy or powdery hard solder so as to cover at least a part of the layer comprising the fine particle material, and further disposing the member having the protruded portion; or uniformly spreading a fine particle material over the surface of the dented portion of the member having the dented portion and disposing the member having the protruded portion having one or a plurality of holes in which a hard solder is inserted so as to closely contact with the layer comprising the fine particle material; or previously preparing a member having a protruded portion at the end of which is formed a layer comprising a hard solder and a fine particle material, disposing a hard solder on the surface of a dented portion of a member having the dented portion and disposing thereon the member having the protruded portion, and a step of eating them to a given temperature under application of pressure to melt the hard solder and impregnating the fine particle material with this molten hard solder to form a bonding layer comprising the hard solder and the fine particle material, thereby to bond the different members through the fitting structure.

Conditions employed for bonding other than those mentioned above, for example, cooling condition and others can be in accordance with the disclosure of Japanese Patent Application No.10-52971 filed on Feb. 18, 1998. Therefore, the disclosure of Japanese Patent Application No.10-52971 filed on Feb. 18, 1998 is incorporated herein by reference.

The first embodiment of the bonding method according to the first aspect of the present invention is a method for bonding different members through a fitting structure which comprises uniformly spreading a fine particle material (4) over the surface of a dented portion of a member (1) having the dented portion, then disposing a platy or powdery hard solder (3) so as to cover at least a part of the layer comprising the fine particle material, further disposing a member (2) having a protruded portion, heating them to a given temperature under application of pressure to melt the hard solder and impregnate the fine particle material with this molten hard solder to form a bonding layer of an adhesive composition comprising the hard solder and the fine particle material. In this case, a mixture of the fine particle material and the powdery hard solder may be used in place of the layer comprising the fine particle material and the platy or powdery hard solder which covers said layer. The second embodiment is a method for bonding different embers through a fitting structure which comprises uniformly spreading a fine particle material (4) over the surface of a dented portion of a member (1) having the dented portion, disposing a member (2) having a protruded portion provided with one or a plurality of holes in which a hard solder (3) is inserted so that the member (2) closely contacts with the layer comprising the fine particle material, heating them to a given temperature under application of pressure to melt the hard solder and impregnate the fine particle material with this molten hard solder to form a bonding layer of an adhesive composition comprising the hard solder and the fine particle material. The third embodiment is a method for bonding different members through a fitting structure which comprises previously preparing a member (2) having a protruded portion at the end of which is formed a layer (5) comprising a hard solder and a fine particle material, disposing a hard solder (6) on the surface of a dented portion of a member (1) having the dented portion, disposing thereon said member having the protruded portion having said layer, heating them to a given temperature under application of pressure to melt the layer comprising the hard solder and the fine particle material and formed at the end of the member having the protruded portion and the hard solder disposed on the surface of the dented portion of the member having the dented portion to form a bonding layer comprising the hard solder and the fine particle material.

In the first and second embodiments, when the fine particle material is spread over the dented portion of the ember having the dented portion, in order to exhibit the desired thermal stress relaxing function in the case of the hard solder penetrating into the layer formed of the fine particle material, the average particle size of the fine particle material is about 10–500 $\mu$m, preferably about 20–100 $\mu$m. If the average particle size is lower than the lower limit, sufficient adhering power of the bonding layer of the adhesive composition cannot sometimes be obtained, and if it is more than the upper limit, since non-uniformity at microscopic level of the characteristics such as expansion coefficient of the adhesive composition constituting the bonding layer becomes conspicuous and, hence, heat resistance characteristic is sometimes deteriorated and this is not desired. In this case, from the points of control of various factors such as packing density which directly affect the quality of final products, it is preferred to use particles in which proportion of the particles belonging to a specific range of particle size in the particle size distribution is preferably 80% or more, more preferably 90% or more, further preferably 95% or more. When particles of crushed shape having the above particle size distribution are used, the packing density thereof in the hard solder is about 45–60%. The fine particle material comprising particles of such particle size distribution can be prepared by screening the particles by a sieve specified in JIS Z-8801 to adjust the particle size. That is, they are screened using sieves differing by about three stages in nominal size of sieve opening, for example, by using sieves of 75 $\mu$m and 45 $\mu$m in nominal size or those of 63 $\mu$m and 38 $\mu$m in nominal size as upper and lower sieves, respectively, and the particles which have passed through the sieve of the courser opening and remained on the sieve of the finer opening can be used. Even if the control is carried out more severely, improvement in technical effects affecting the bonding strength and the like is small considering the influence on production cost and the like.

Furthermore, packing rate can be increased by positively manipulating the distribution of average particle size of the particles, for example, by mixing particles of two or more groups differing in average particle size. Thus, thickness of the layer formed by spreading the fine particle material is usually 0.1–2 mm, preferably 0.3–1.0 mm. Due to the restriction by the particle size of the fine particles, if the thickness is less than 0.1 mm, it is difficult to form a uniform bonding layer, and if the thickness of the bonding layer is more than 2 mm, amount of the hard solder penetrated to attain the thickness must be increased to cause restriction in the shape at the bonding portion or insufficient uniformity of the layer formed, while the effects such as relaxation of residual stress at the bonding portion cannot be enhanced.

A hard solder is disposed so as to cover at least a part of the thus formed layer comprising the fine particle material. In disposing the hard solder, a desired volume of the platy or powdery hard solder is used so as to closely contact with the layer of the fine particle material as shown in FIG. 1. In this case, as far as the hard solder has a weight corresponding to the desired volume, it may cover the whole surface or only a part of the surface of the fine particle material.

Figure 2:
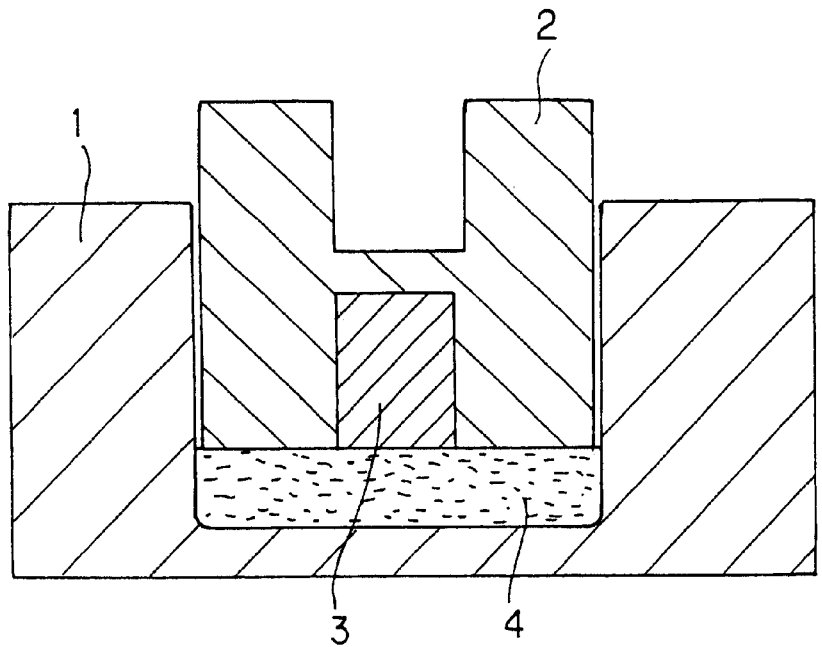
FIG. 2 schematically shows another embodiment of the bonding method of the present invention.
Figure 3:
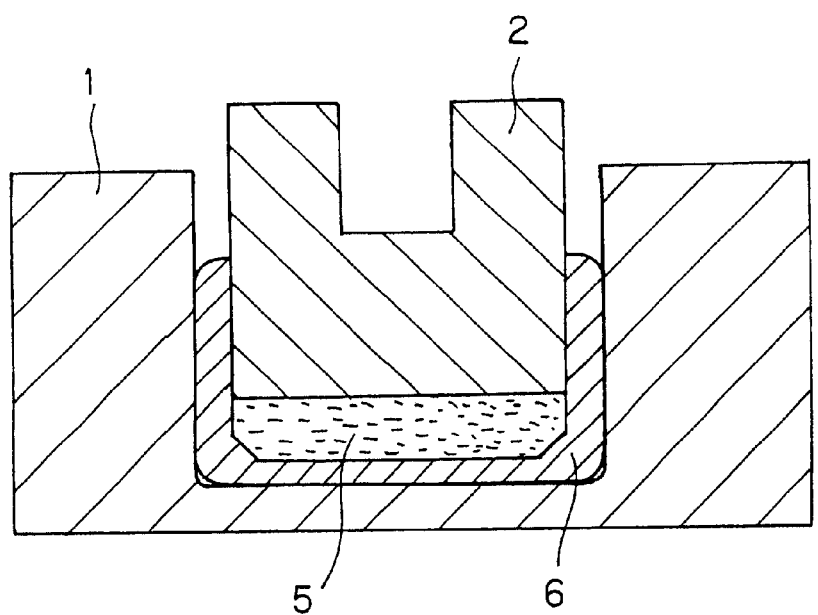
FIG. 3 schematically shows further another embodiment of the bonding method of the present invention.

Alternatively, a desired amount of a molten hard solder is poured in a portion in which the hard solder is to be disposed and which is provided at apart of one of the different members, usually, the member having a protruded portion constituting the fitting structure and being different from the member having the dented portion, and then the molten hard solder is hardened, and thus the hard solder can be disposed as shown in FIG. 2. Moreover, a hard solder shaped by mechanical working may be inserted in the portion in which the hard solder is to be disposed. Although it depends on the shape of the member having the protruded portion which constitutes the male portion in the fitting structure, since it suffices that a necessary amount of the hard solder can be suitably molten and penetrated into the fine particle material disposed, naturally the amount of the hard solder can be optionally selected within the range of the amount of the hard solder which can be molten and penetrated. The position of the portion in which the hard solder is to be disposed is not limited, and the portion may be provided at the central part as shown in FIG. 2, or a plurality of the portions may be provided.

Here, disposing the hard solder so as to cover at least a part means that the position of the hard solder to be disposed is determined so that the hard solder closely contacts with at least a part of the densely formed fine particle layer and the hard solder is disposed so that when the member thus determined in their positions and combined are heated to melt the hard solder, the hard solder penetrates into the space between the fine particles without breaking the denseness of the fine particle layer and a uniform adhesive composition layer can be formed upon cooling later. In bonding, when the hard solder is molten and penetrated into the different members fitted as mentioned above under application of pressure, the densely formed fine particle layer absorbs the hard solder without changing the bulk density and the remainder hard solder is discharged to the outside through the space between the fitting portions, and as a result the portions are firmly bonded through the uniform adhesive composition layer.

The melting temperature is usually higher 10–150° C. than the melting point of the hard solder, desirably higher 10–50° C. than the melting point since the hard solder must be molten and penetrated into the layer comprising the fine particle material. If the melting temperature is higher than the above range, wetting between the hard solder and the metal to be bonded becomes too active, and the phenomenon of the hard solder wetting and rising on the metal side occurs to form vacuoles called cavities or the element in the solder high in vapor pressure is evaporated to cause change of solder composition. However, when a high-melting metal such as Ti is added as an activating material, alloying of the hard solder with the additive may result in increase of actual melting point than that of the hard solder, and, hence, a temperature higher than the above range can be selected, taking into consideration the kind of the activating material and amount thereof. For example, in the case of penetrating BAg8 as the hard solder, when Ti as the activating material is added in an amount of about 5–30% by weight based on the weight of the fine particles, it is preferred to select a temperature higher about 100–300° C. than the melting point of BAg8. In case the activating material is added to the fine particles, it is preferred to conduct previously a small-scale test for setting a proper temperature range.

Keeping time of the temperature depends on the properties of the members to be bonded, and is usually about 5–90 minutes, preferably about 10–30 minutes from the starting of melting of the solder to the completion of hardening in the course of heating history of raising of the temperature, keeping of the temperature, and falling of the temperature. If the keeping time is too short, sometimes the actual temperature of that portion cannot follow the controlled furnace temperature and the solder is not molten. In the case of long keeping time, when reactions take place between the member to be bonded and the solder, and the fine particle material and the solder, the reactions proceed too much. Thus, care must be taken for the selection of the keeping time. Pressure applied is necessary to densely maintain the spread fine particle material until the solder is penetrated and hardened and not to produce spaces between the layer of the fine particle material and the solder. This pressure can be optionally selected taking into consideration material, size and properties of the members to be bonded. For example, a standard can be set up at about 0.1–2.0 MPa in the first embodiment, and at about 0.5–30.0 MPa in the second embodiment. In the first embodiment, the object can be attained only by densely maintaining the spread fine particle material until the solder penetrates thereinto and hardens, and, therefore, the pressure may be low. On the other hand, in the second embodiment, a space which is to be formed by absorption of the molten hard solder layer into the layer of the fine particles and which corresponds to the thickness of the hard solder layer is removed by applying the pressure simultaneously with melting of the hard solder, whereby the members and bonding material are firmly bonded, and thus a stress is needed not so as to produce a space between the layer of the fine particle material and the solder.

As the third embodiment of the present invention, there is a method according to which a member having a protruded portion at the end of which is formed a layer comprising a hard solder and a fine particle material is previously prepared, a hard solder is disposed on the surface of a dented portion of a member having the dented portion, the member having the protruded portion is disposed on the hard solder disposed on the surface of the dented portion of the member, and these are heated to a given temperature under application of pressure to form a bonding layer of an adhesive composition comprising the hard solder and the fine particle material. In this method, the hard solder and the fine particle material used for previously forming the adhesive composition layer, and the temperature conditions for the formation thereof are the same as in the first and second embodiments, and, therefore, explanation of them is omitted. In forming the layer, preferably, after the layer is formed utilizing a jig such as of high-density carbon under application of pressure, the shape of the layer is corrected by mechanical working so as to conform to the dented portion. The composition of the hard solder used for bonding to the member having the dented portion may be the same as of the above-mentioned hard solder, but more preferably is close to the composition of the above hard solder with somewhat lower in melting point. This is because if the same hard solder is used, sometimes the adhesive composition layer is again molten to produce vacuoles in the layer. The hard solder is molten by heat treatment and integrated with the adhesive layer at the uppermost surface of the adhesive layer to form a new adhesive layer, resulting in a bonded body having the same effects as those shown in the first and second embodiments. In this case, if the new adhesive layer is not formed by integration of the hard solder with the adhesive layer at the uppermost surface thereof, namely, if a metal solder layer remains which is observed separately from the adhesive layer when the portion is observed with magnification, heat resistance of the produced composite member is considerably deteriorated during assembling.

As examples of combination of the two or more different members, mention may be made of the combinations of ceramics members such as of aluminum nitride and silicon nitride with metallic members such as of molybdenum, Kovar and tungsten or combinations of different ceramics members differing in the starting materials. More specific examples are composite members obtained by fitting and bonding aluminum nitride members which are used in production of semiconductor wafers and exhibit electrostatic chuck function or heater function by metal electrodes or metal electrical heating elements incorporated therein with metallic molybdenum members bonded as terminals for supplying electricity to the incorporated metal electrodes or the like.

The hard solders used for the adhesive compositions in the present invention include, for example, solders containing as a base a metal such as Au, Ag, Cu, Pd, Al or Ni. Of course, those which are more suitable can be used depending on wettability between the members to be bonded and the solders, reactivity between the members to be bonded or dispersion particles and the solders, or temperature conditions of using the solders. In the case of the bonded members being used at an environmental temperature of 500° C. or lower, there may be suitably used Al-based solders such as BA4004 (Al-10Si-1.5Mg). In the case of the bonded members being used at an environmental temperature of 500° C. or higher, there may be suitably used Au, BAu-4(Au-18Ni), BAg-8(Ag-28Cu) and the like.

In order to efficiently reduce the thermal stress, in other words, in order to form a bonding layer comprising an adhesive composition controlled in expansion coefficient, it is necessary to adjust the kind of fine particle material and packing density thereof for the hard solder, and, for this purpose, it is necessary to adjust the thermal expansion coefficient of the adhesive composition layer. As the fine particle materials which reduce the thermal stress, those of the smaller expansion coefficient are more advantageous for reducing the thermal expansion coefficient of the adhesive composition layer. The packing density of the fine particle material for the hard solder is 30–90%, preferably 40–70% by volume. In this case, increasing the packing density of the fine particle material is advantageous for reducing the expansion coefficient, but too high packing density is not preferred because deterioration of bonding strength is sometimes caused. If the packing density is lower, sometimes the desired expansion coefficient cannot be obtained, and care should be taken in this respect. That is, adjustment of the expansion coefficient can be attained by selecting the kind of the fine particle material so as to be able to attain the desired expansion coefficient or by suitably selecting the particle size distribution of the fine particle material.

When ceramic is used as the fine particle material which reduces the thermal stress, there is a problem in the wettability with the hard solder, but the ceramic can be coated with a metal. In case the ceramic is coated with a metal, it is effective to carrying out the coating by sputtering. Furthermore, plating can also be employed. The plating method is not limited, and electroless plating is suitable. Moreover, without metallic plating treatment, the wettability can be ensured by forming on the surface of the ceramic a reactive layer of an activating material such as a nitride, an oxide or a carbide. That is, there may be employed a method of adding an additive such as Ti by incorporating it in the form of fine particles into the solder or the fine particle material. Amount of the activating material is suitably about 0.5–5% by weight based on the hard solder.

As a second aspect of the present invention, a composite member comprising at least two different members in which a member having a dented portion which forms a fitting structure and a member having a protruded portion which forms a fitting structure and being different from the member having the dented portion are fitted with each other and fundamentally bonded with a bonding layer of an adhesive composition comprising a fine particle material and a hard solder, can be produced by the above-mentioned method. A clearance formed in the fitting structure portion between the wall surface of the member having a dented portion and the wall surface of the member having a protruded portion and being different from the member having the dented portion can be usually about 0.01–0.3 mm, preferably about 0.02–0.07 mm. If the clearance is less than the above lower limit, there is the possibility that the members cannot be fitted, and if it is more than the upper limit, there is the possibility that the solder is one-sidedly filled as mentioned above.

The present invention will be explained by the following examples, which never limit the present invention. Evaluation of bonding state and thermal cycle resistance was conducted by judging whether deterioration of tensile strength of the bonded portion occurred or not after being exposed to the thermal cycle atmosphere. In this case, when the strength deteriorated at least 25% than before being exposed to the thermal cycling atmosphere, the sample was judged to be bad. For reference, whether cracking or peeling at the bonded portion occurred or not was also examined by observing a section of the bonding layer.

EXAMPLE 1

As a member having a dented portion which forms a fitting structure, an aluminum nitride member having a thickness of 10.0 mm and having a vertically bored hole of 5.07 mm in diameter and 9.5 mm in depth used for fitting, and as a member having a protruded portion which forms a fitting structure and being different from the member having a dented portion, a columnar metallic molybdenum member of 5.0 mm in diameter and a length of 15.0 mm were bonded in the following manner.

As a fine particle material, alumina of 47 $\mu$m in average particle size the surface of which was plated with Ni at a thickness of about 0.5 $\mu$m was uniformly spread over the surface of the dented portion of the above aluminum nitride member plated with Ni at a thickness of about 0.5 $\mu$m. Thickness of the alumina layer was 0.8 mm. Then, A5005 (Al-0.8Mg; melting point: 650° C.) of 5.0 mm in diameter and 0.5 mm in thickness as a hard solder was disposed so as to closely contact with the alumina layer. The above metallic molybdenum member the surface of which was plated with Ni at a thickness of about 0.5 $\mu$m was disposed on the hard solder so as to fit in the dented portion of the aluminum nitride member, followed by heating under application of a pressure of 2.5 MPa and then, after reaching 700° C., keeping that temperature for 10 minutes to bond the members. The hard solder was molten during the heating and penetrated into the alumina layer to form a bonding layer. The members were bonded through the thus formed bonding layer. Thickness of the bonding layer was 0.8 mm.

Figure 4A:
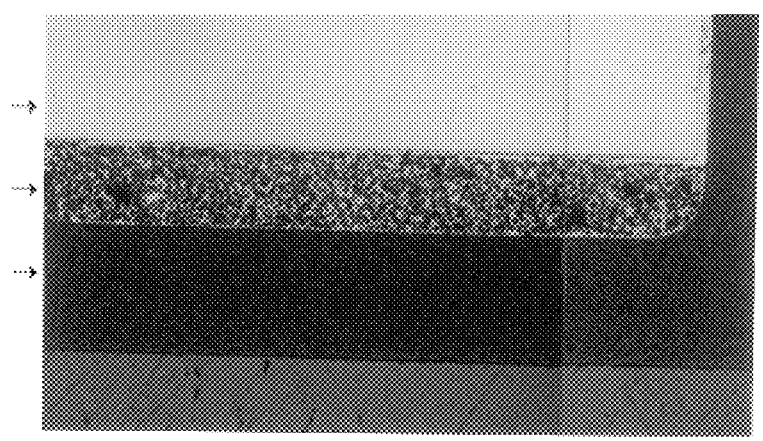
FIG. 4: (*a*) is a photograph of sectional structure of the members just after bonded in Example 1, (*b*) is an enlarged photograph of sectional structure of the bonded interface portion just after bonded, and (*c*) is an enlarged photograph of sectional structure of the bonded interface portion after subjected to the thermal cycle test.
Figure 4B:
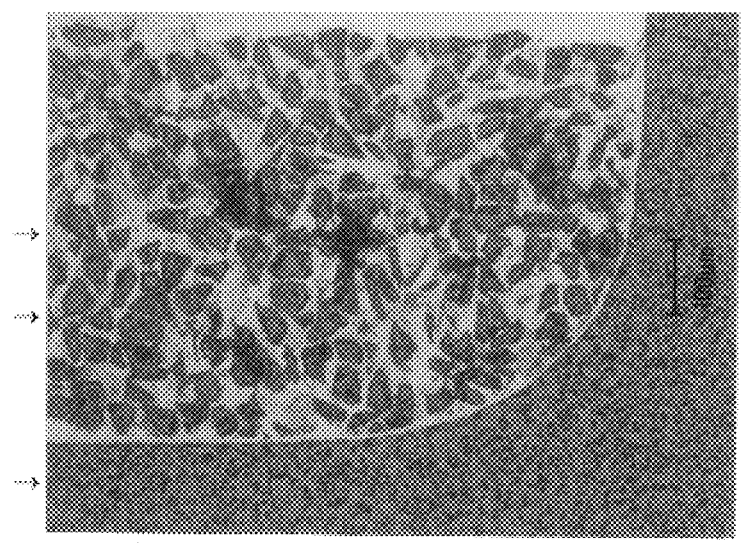
Figure 4C:
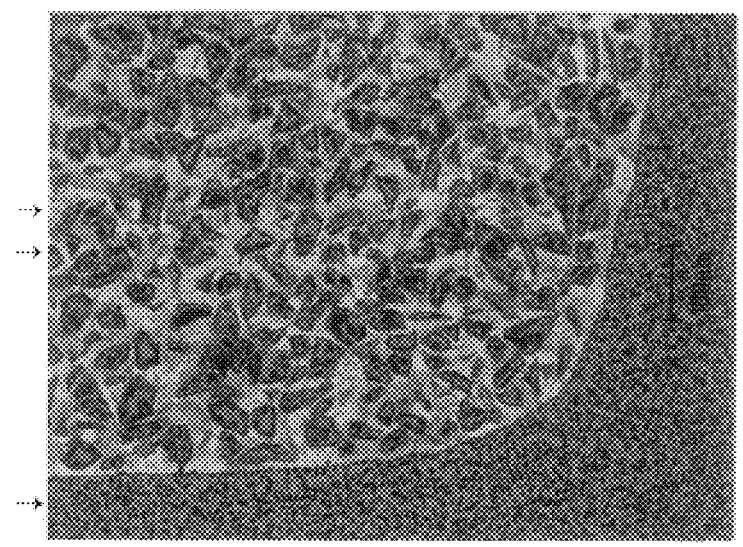

The resulting bonded member was subjected to a thermal cycle test. The thermal cycle test was conducted by repeating 50 times the cycle which comprised heating the bonded member from 60° C. to 180° C. at a heating rate of 2.5° C./min, immediately after reaching 180° C., cooling the bonded member to 60 at a cooling rate of −2.5° C./min and immediately after reaching 60° C., repeating this cycle. A schematic sectional photograph of the members as bonded and the bonding layer is shown in FIG. 4(a), an enlarged sectional photograph of the aluminum nitride and bonding layer is shown in FIG. 4(b), and an enlarged sectional photograph of the aluminum nitride and bonding layer after subjected to the thermal cycle test is shown in FIG. 4(c). Results of a tensile test conducted on the members as bonded and the bonded members after subjected to the thermal cycle test are shown in Table 1.

Figure 5A:
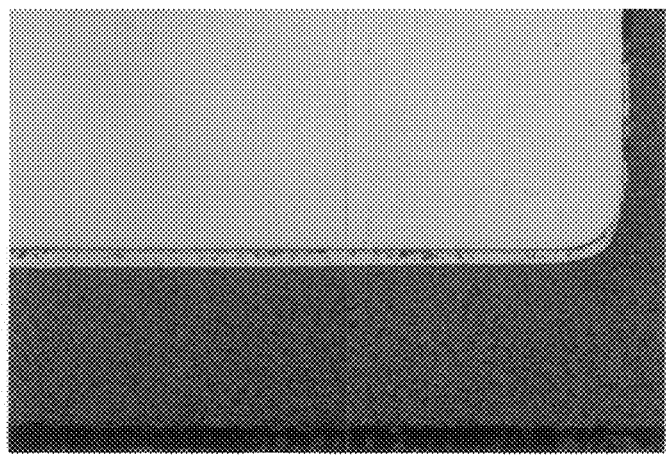
FIG. 5: (*a*) is a photograph of sectional structure of the members just after bonded in the comparative example, (*b*) is an enlarged photograph of sectional structure of the bonded interface portion just after bonded, and (*c*) is an enlarged photograph of sectional structure of the bonded interface portion after subjected to the thermal cycle test.
Figure 5B:
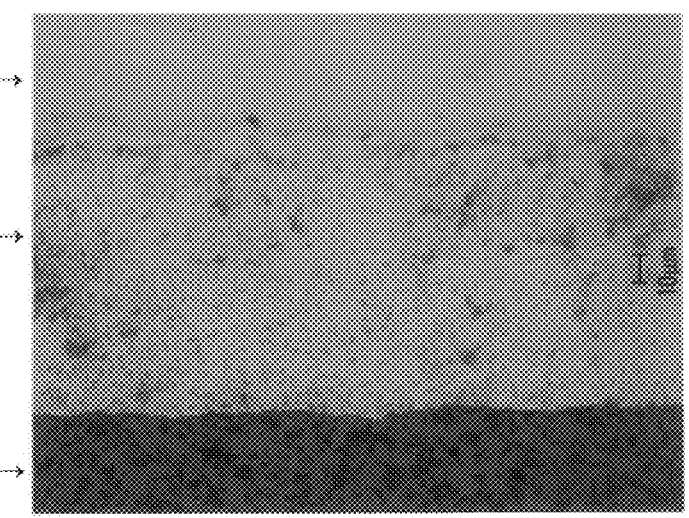
Figure 5C:

As a comparative member, a composite member was produced by bonding the metallic molybdenum member and the aluminum nitride member using only a metal solder A5005, and was subjected to the same evaluation as above. The conditions such as size of the members used, the surface treatment and the bonding conditions were the same as above, except that the fine particle material was not used between the members. Thickness of the bonding layer of the metal solder A5005 formed at the bonding was 0.1 mm. A schematic sectional photograph of the members as bonded and the bonding layer is shown in FIG. 5(a), an enlarged sectional photograph of the aluminum nitride and the bonding layer is shown in FIG. 5(b), and an enlarged sectional photograph of the aluminum nitride and the bonding layer after subjected to the thermal cycle test is shown in FIG. 5(c). Results of a tensile test conducted on the members as bonded and the bonded members after subjected to the thermal cycle test are shown in Table 1.

EXAMPLE 2

As a member having a dented portion which forms a fitting structure, an aluminum nitride member having a thickness of 10.0 mm and having a vertically bored hole of 5.07 mm in diameter and 9.5 mm in depth used for fitting, and as a member having a protruded portion which forms a fitting structure and being different from the member having a dented portion, a columnar metallic molybdenum member of 5.0 mm in diameter and 15.0 mm in length provided, at one end, with a portion in which a hard solder of 2.5 mm in diameter and 3.0 mm in length can be stored and in which a hard solder of the same size was fitted were bonded in the following manner.

As a fine particle material, alumina of 47 μm in average particle size the surface of which was plated with Ni at a thickness of about 0.5 μm was uniformly spread over the surface of the dented portion of the above aluminum nitride member plated with Ni at a thickness of about 0.5 μm. In this case, the fine particle material spread was lightly rammed by a rod having a smooth end surface to ensure smoothness and packing of the material. Thickness of the alumina layer after subjected to this operation was 0.8 mm. The metallic molybdenum member disposed so as to closely contact with the layer comprising the fine particle material and include A5005 (Al-0.8Mg; melting point: 650° C.) as a hard solder was fitted in the dented portion of the aluminum nitride member as shown in FIG. 2, followed by heating under application of a pressure of 0.5 MPa. The heating history was the same as in Example 1. Thickness of the formed composite bonding layer was 0.8 mm. The resulting bonded members were subjected to the thermal cycle test. The conditions of the thermal cycle test were the same as in Example 1.

Results of the tensile strength of the members as bonded and the bonded members after subjected to the thermal cycle test are shown in Table 1. The bonding area at the bonded portion in this Example 2 was 75% of the bonding area in Example 1.

EXAMPLE 3

As a member having a dented portion which forms a fitting structure, an aluminum nitride member having a thickness of 10.0 mm and having a vertically bored hole of 5.07 mm in diameter and 9.5 mm in depth used for fitting, and as a member having a protruded portion which forms a fitting structure and being different from the member having a dented portion, a columnar metallic molybdenum member of 5.0 mm in diameter and 15.0 mm in length, on one end surface of which was previously formed an adhesive composition layer comprising the hard solder and the fine particle material used in Examples 1 and 2 were bonded in the following manner.

On the surface of the dented portion of the above aluminum nitride member plated with Ni at a thickness of about 0.5 μm was placed a metal solder BA4004 (Al-10Si-1.5Mg; melting point: 580° C.) so as to closely contact with the surface of the dented portion, and the above columnar metallic molybdenum member was disposed so as to closely contact with the metal solder. The molybdenum member having the adhesive composition layer at the end was prepared by uniformly spreading over the end surface of a columnar molybdenum an alumina of 47 μm in average particle size plated with Ni at a thickness of about 0.5 μm using a jig made of high density carbon, and penetrating a molten metal solder A5005 into the alumina layer to form the adhesive composition layer, and then grinding the adhesive composition layer to a thickness of 0.8 mm and a diameter of 5.0 mm. The temperature condition and others for the penetration of the solder were the same as the bonding conditions in Example 1. The fitted members were heated under application of a pressure of 0.5 MPa and after reaching 610° C., kept at that temperature for 10 minutes to bond them.

The reason for using BA4004 as a metal solder in this example is that if the same hard solder A5005 as used for the adhesive composition layer formed at the end of the molybdenum member was used, the adhesive composition layer was remolten to cause occurrence of cavities, and hence BA4004 was used which was a hard solder of the similar composition to the composition of the hard solder forming the adhesive composition layer and which was lower in melting point. By the above heat treatment, the hard solder BA4004 was molten and integrated with the adhesive composition layer at the uppermost surface of the layer to realize a bonding state similar to the bonding state in Example 1 according to enlargement observation of section. The resulting bonded members were subjected to the thermal cycle test. The conditions of the thermal cycle test were the same as in Example 1. Results of tensile strength of the members as bonded and the bonded members after subjected to the thermal cycle test are shown in Table 1.

TABLE 1

| No. of Example or Comparative Example | Strength as bonded (MPa) | Strength after subjected to thermal cycle test (MPa) | Ratio of strength before & after subjected to thermal cycle test (MPa) |
|---|---|---|---|
| Example 1 | 4723 | 4969 | 105 |
| Example 2 | 5069 | 4794 | 95 |
| Example 3 | 4639 | 4549 | 98 |
| Comp. Example | 2566 | 1166 | 45 |

From the test results shown in Table 1 and the 10 accompanying photographs, it can be seen that in the composite members made by the bonding method of the present invention, there were generated no peeling at the bonded portions when exposed to thermal history and no deterioration in bonding strength as generated in the comparative example where only a metal solder was used.

According to the bonding method of the present invention in which two or more different members are bonded through a fitting structure, even if the clearance between wall surfaces of the different members in the fitting structure has a space not enough to pour a given amount of a hard solder therein, these members can be bonded with a sufficient strength. Furthermore, the present invention can provide a composite member comprising two or more different members having a sufficient bonding strength and a sufficient heat resistance which are bonded through a fitting structure.

What is claimed is:

1. A composite member comprising a member having a dented portion which forms a fitting structure and a member having a protruded portion which forms a fitting structure and being different from the member having the dented portion, said different members being fitted to each other and bonded with a bonding layer comprising a fine particle material and a hard solder and wherein a packing density of the fine particle material with respect to the hard solder in the bonding layer is 30–90% by volume.

2. A composite member according to claim 1, wherein at least one of the two or more different members is a ceramic member.

3. A composite member according to claim 1, wherein the two or more different members are combination of a metal member and a ceramic member.

4. A composite member according to claim 1, wherein the fine particles are a fine particle material which reduces thermal stress.

5. A composite member according to claim 1, wherein a base metal of the hard solder is Au, Ag, Cu, Pd, Al or Ni, and the fine particle material is ceramic fine particles, cermet fine particles or low-expansion metal fine particles.

6. A composite member comprising a member having a dented portion which forms a fitting structure and a member having a protruded portion which forms a fitting structure and being different from the member having the dented portion, said different members being fitted to each other and bonded with a bonding layer comprising a fine particle material and a hard solder, wherein the fine particle material is ceramic fine particles the surface of which is coated with a metal by plating or sputtering.

7. A composite member according to claim 1, wherein the packing density of the fine particle material with respect to the hard solder in the bonding layer is 30–70% by volume.

8. A composite member according to claim 1, wherein the packing density of the fine particle material with respect to the hard solder in the bonding layer is 40–70% by volume.

* * * * *